United States Patent
Ji

(10) Patent No.: US 10,015,079 B2
(45) Date of Patent: Jul. 3, 2018

(54) REROUTING SEQUENCE PLANNING METHOD AND SYSTEM

(71) Applicant: Huawei Technologies Co., Ltd., Shenzhen, Guangdong (CN)

(72) Inventor: Zhigang Ji, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 99 days.

(21) Appl. No.: 15/183,584

(22) Filed: Jun. 15, 2016

(65) Prior Publication Data

US 2016/0294675 A1 Oct. 6, 2016

Related U.S. Application Data

(63) Continuation of application No. PCT/CN2013/089552, filed on Dec. 16, 2013.

(51) Int. Cl.
*H04L 12/729* (2013.01)
*H04L 12/26* (2006.01)
(Continued)

(52) U.S. Cl.
CPC ........ *H04L 45/125* (2013.01); *H04L 43/0882* (2013.01); *H04L 45/50* (2013.01);
(Continued)

(58) Field of Classification Search
None
See application file for complete search history.

(56) References Cited

U.S. PATENT DOCUMENTS 6,768,718 B1 * 7/2004 Beshai .................. H04L 45/00
370/237
7,012,919 B1 * 3/2006 So ...................... H04L 41/5019
370/235
(Continued)

FOREIGN PATENT DOCUMENTS

CN 1958260 A 5/2007
CN 101155131 A 4/2008
(Continued)

OTHER PUBLICATIONS

J.C. de Oliveira et al., "A New Preemption Policy for DiffServ-Aware Traffic Engineering to Minimize Rerouting", IEEE INFOCOM 2002, p. 695-704.

*Primary Examiner* — Benjamin Lamont

(57) ABSTRACT

Embodiments of the present application disclose a rerouting sequence planning method and system. The method includes: calculating reference values of to-be-adjusted LSPs, where the reference values are used to denote adjusted priorities of the to-be-adjusted LSPs; selecting a to-be-adjusted LSP with a highest priority from the to-be-adjusted LSPs; determining, according to a critical value of the reference values of the to-be-adjusted LSPs and a reference value of the to-be-adjusted LSP with the highest priority, whether the to-be-adjusted LSP with the highest priority is suitable for adjustment; and if the to-be-adjusted LSP with the highest priority is suitable for adjustment, adjusting the to-be-adjusted LSP with the highest priority to a corresponding final-state LSP; and if the to-be-adjusted LSP with the highest priority is not suitable for adjustment, selecting at least one to-be-adjusted LSP and adjusting the at least one selected to-be-adjusted LSP to a corresponding temporary LSP.

13 Claims, 10 Drawing Sheets

(51) Int. Cl.
*H04L 12/723* (2013.01)
*H04L 12/851* (2013.01)
*H04L 12/911* (2013.01)
*H04L 12/751* (2013.01)

(52) U.S. Cl.
CPC ............ *H04L 47/24* (2013.01); *H04L 47/822* (2013.01); *H04L 45/02* (2013.01); *H04L 47/245* (2013.01)

(56) References Cited

U.S. PATENT DOCUMENTS

| | | | | |
|---|---|---|---|---|
| 7,126,907 | B2* | 10/2006 | Carpini | H04L 45/00 370/218 |
| 9,191,863 | B2* | 11/2015 | Tanikawa | H04L 47/762 |
| 2002/0123901 | A1* | 9/2002 | Nguyen | G06Q 10/06 709/207 |
| 2002/0141345 | A1* | 10/2002 | Szviatovszki | H04L 45/00 370/238 |
| 2003/0046426 | A1* | 3/2003 | Nguyen | H04L 41/0681 709/242 |
| 2005/0147031 | A1* | 7/2005 | Bhatia | H04L 1/0001 370/229 |
| 2006/0182035 | A1* | 8/2006 | Vasseur | H04L 45/00 370/238 |
| 2007/0160061 | A1* | 7/2007 | Vasseur | H04L 45/02 370/395.4 |
| 2009/0219938 | A1* | 9/2009 | So | H04L 45/00 370/395.3 |
| 2012/0082034 | A1* | 4/2012 | Vasseur | H04L 45/04 370/235 |
| 2012/0147895 | A1* | 6/2012 | Choudhury | H04L 45/125 370/401 |

FOREIGN PATENT DOCUMENTS

| | | |
|---|---|---|
| CN | 101686200 A | 3/2010 |
| CN | 103312628 A | 9/2013 |
| CN | 103354521 A | 10/2013 |

\* cited by examiner

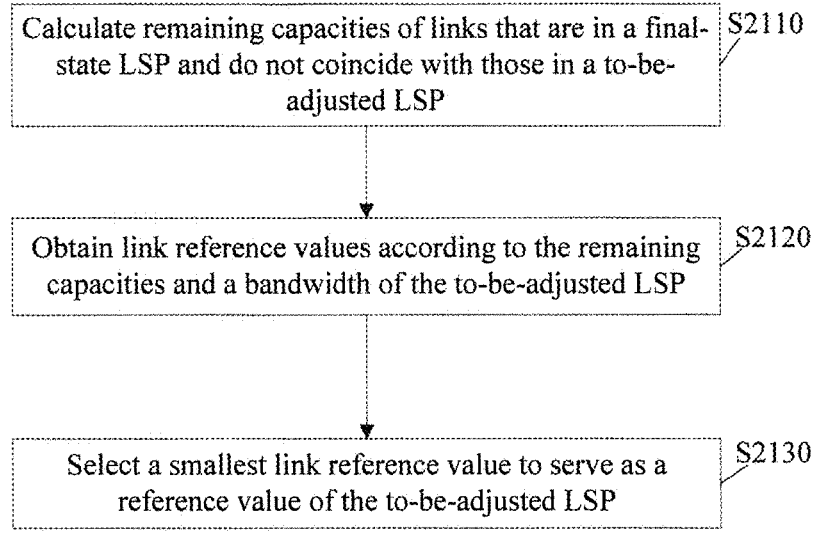
FIG. 2-a
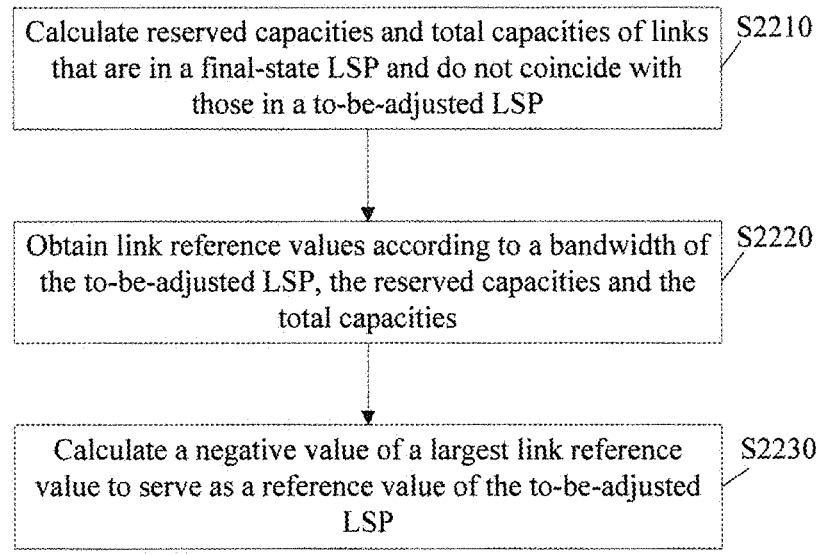
FIG. 2-b

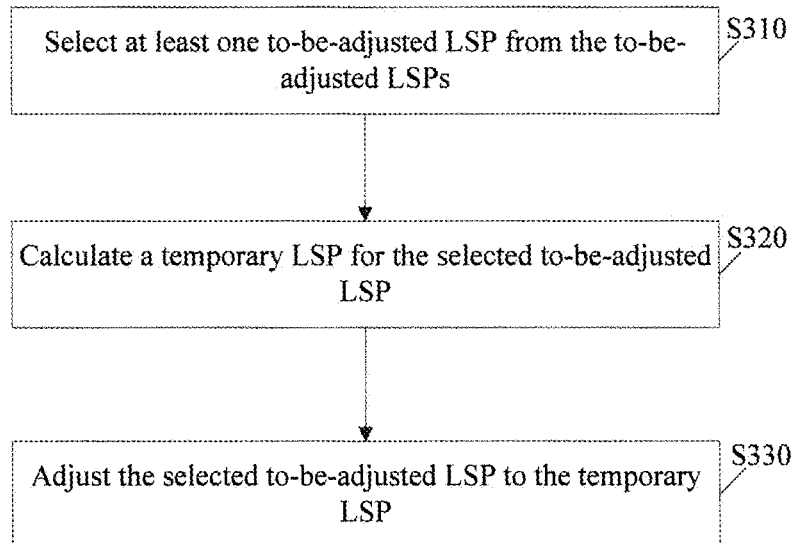
FIG. 3-a
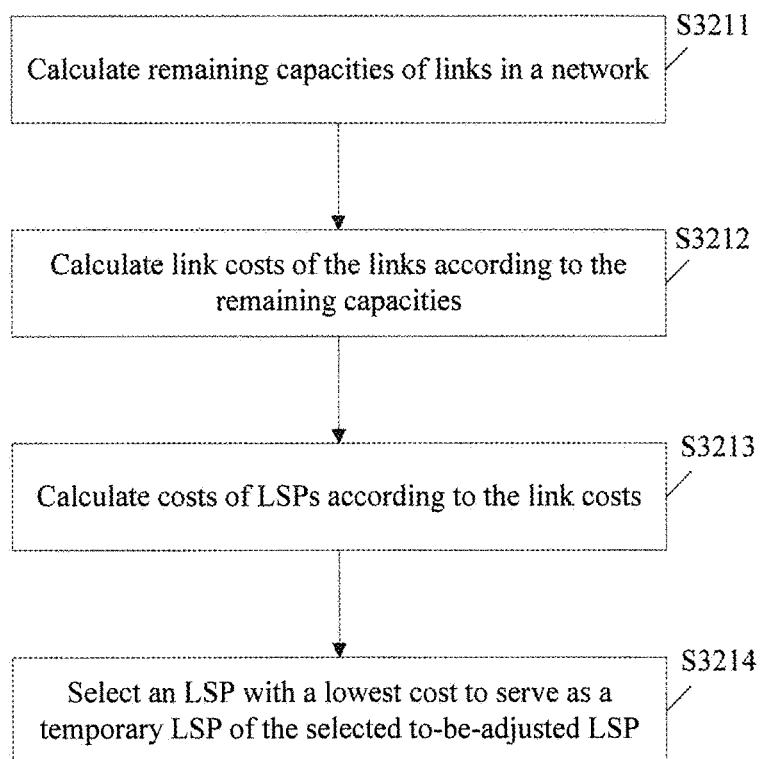
FIG. 3-b

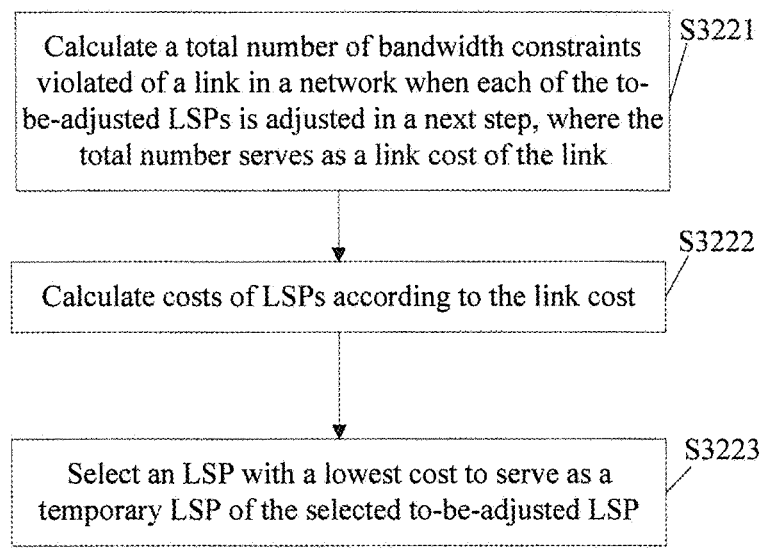
FIG. 3-c

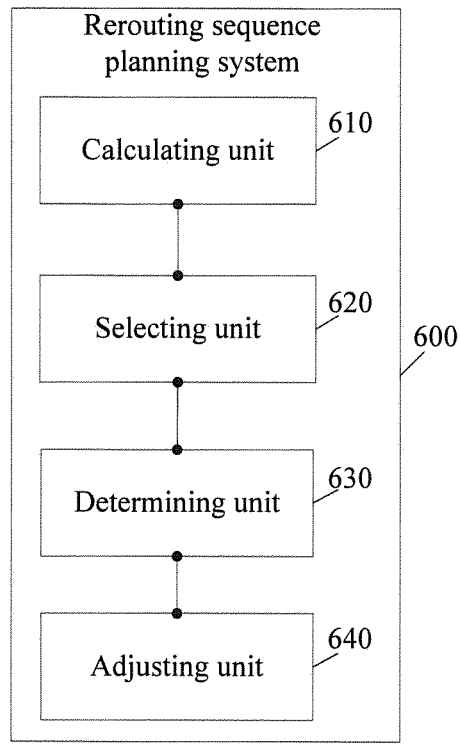
FIG. 6
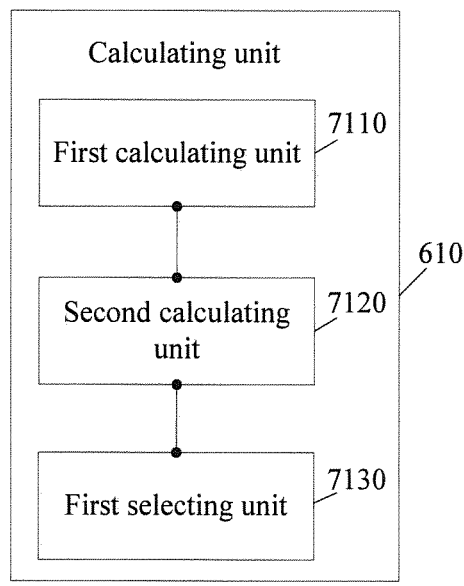
FIG. 7-a

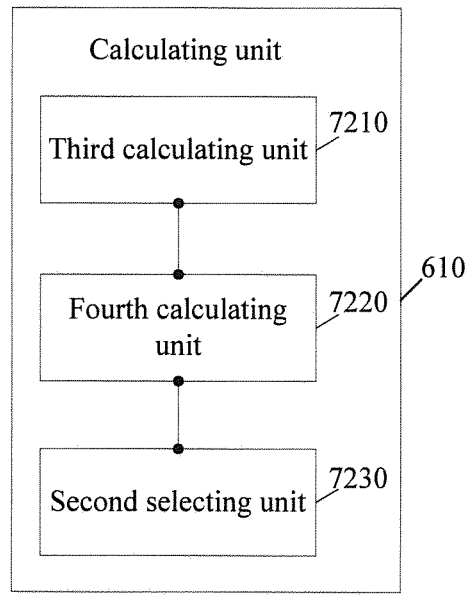
FIG. 7-b
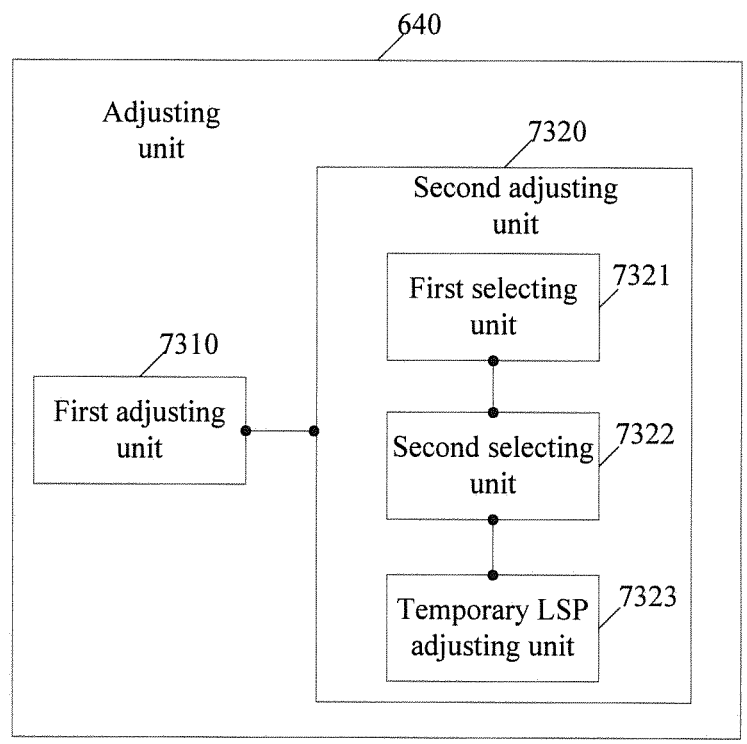
FIG. 7-c

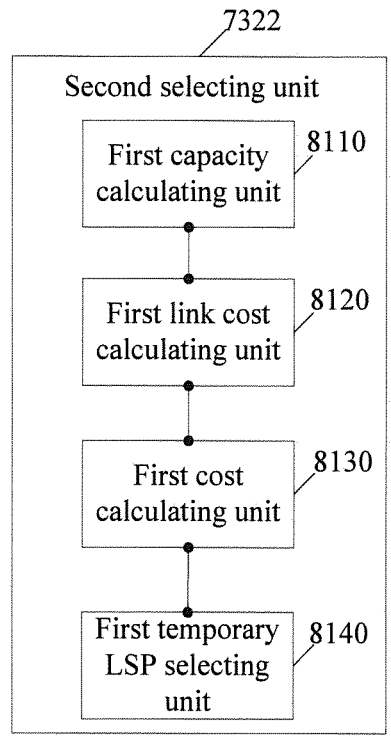
FIG. 8-a
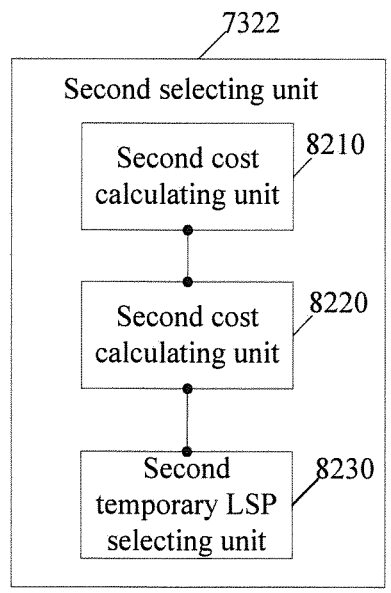
FIG. 8-b

REROUTING SEQUENCE PLANNING METHOD AND SYSTEM

CROSS-REFERENCE TO RELATED APPLICATIONS

This application is a continuation of International Application No. PCT/CN2013/089552, filed on Dec. 16, 2013, which is hereby incorporated by reference in its entirety.

TECHNICAL FIELD

The present application relates to the field of communications technologies, and in particular, to a rerouting sequence planning method and system.

BACKGROUND

In a conventional distributed network, because a network device has neither a global service nor path information, a conventional constrained shortest path first (Constrained Shortest Path First, CSPF for short) algorithm is generally used to calculate a route, which, however, cannot implement optimized deployment of entire network services and maximization of a network utilization ratio.

In a software defined networking (Software Defined Networking, SDN for short) technology, the optimized deployment of network services may be implemented by means of centralized control performed on a network by a controller and by using a global optimization algorithm (Global Optimization Algorithm, GOA for short). However, a proper rerouting sequence planning algorithm is required to implement seamless or hitless switching from an initial network state to a final network state.

In the prior art 1, a proper adjustment sequence of switching from an initial network state to a final network state is found by using error trial and fallback as a core idea. However, time performance of this algorithm is on an exponential scale, and online application in a network is impracticable.

In the prior art 2, direct adjustment from an initial network state to a final network state is required. In this case, a relatively high requirement is imposed on a current network utilization ratio, and a relatively high success ratio is possible only in a network state in which the network utilization ratio is relatively low. However, because most routing algorithms include the GOA algorithm of SDN, in calculating a path, a path that requires a smallest cost is always selected preferentially. Consequently, paths of most services are concentrated on a part of links, which reduces the success ratio of rerouting sequence planning and imposes a higher requirement on the network utilization ratio.

SUMMARY

In view of the foregoing defects, embodiments of the present application provide a rerouting sequence planning method and system, so as to improve time performance of a rerouting sequence planning algorithm and a success ratio of adjustment.

A first aspect of the present application provides a rerouting sequence planning method, including:

calculating reference values of to-be-adjusted label switched paths LSPs, where the reference values are used to denote adjusted priorities of the to-be-adjusted LSPs;

selecting a to-be-adjusted LSP with a highest priority from the to-be-adjusted LSPs;

determining, according to a critical value of the reference values of the to-be-adjusted LSPs and a reference value of the to-be-adjusted LSP with the highest priority, whether the to-be-adjusted LSP with the highest priority is suitable for adjustment, where the critical value of the reference values of the to-be-adjusted LSPs denotes a minimum reference value required for a to-be-adjusted LSP to be adjusted to a final-state LSP; and if the to-be-adjusted LSP with the highest priority is suitable for adjustment, adjusting the to-be-adjusted LSP with the highest priority to a corresponding final-state LSP; and if the to-be-adjusted LSP with the highest priority is not suitable for adjustment, selecting at least one to-be-adjusted LSP and adjusting the at least one selected to-be-adjusted LSP to a corresponding temporary LSP.

With reference to the first aspect, in a first possible implementation manner, the calculating reference values of to-be-adjusted label switched paths LSPs includes: calculating remaining capacities of links that are in a final-state LSP and do not coincide with those in a to-be-adjusted LSP; obtaining link reference values according to the remaining capacities and a bandwidth of the to-be-adjusted LSP; and selecting a smallest link reference value to serve as a reference value of the to-be-adjusted LSP.

With reference to the first aspect, in a second possible implementation manner, the calculating reference values of to-be-adjusted label switched paths LSPs includes: calculating reserved capacities and total capacities of links that are in a final-state LSP and do not coincide with those in a to-be-adjusted LSP; obtaining link reference values according to a bandwidth of the to-be-adjusted LSP, the reserved capacities and the total capacities; and calculating a negative value of a largest link reference value to serve as a reference value of the to-be-adjusted LSP.

With reference to the first aspect, or the first possible implementation manner of the first aspect, or the second possible implementation manner of the first aspect, in a third possible implementation manner, the selecting a to-be-adjusted LSP with a highest priority from the to-be-adjusted LSPs includes: selecting a to-be-adjusted LSP with a largest reference value from the to-be-adjusted LSPs; or selecting a to-be-adjusted LSP with a smallest reference value from the to-be-adjusted LSPs.

With reference to the first aspect, or the first possible implementation manner of the first aspect, or the second possible implementation manner of the first aspect, or the third possible implementation manner of the first aspect, in a fourth possible implementation manner, the selecting at least one to-be-adjusted LSP and adjusting the at least one selected to-be-adjusted LSP to a corresponding temporary LSP includes: selecting at least one to-be-adjusted LSP from the to-be-adjusted LSPs; calculating a temporary LSP for the selected to-be-adjusted LSP; and adjusting the selected to-be-adjusted LSP to the temporary LSP.

With reference to the fourth possible implementation manner of the first aspect, in a fifth possible implementation manner, the calculating a temporary LSP for the selected to-be-adjusted LSP includes: calculating remaining capacities of links in a network; calculating link costs of the links according to the remaining capacities; calculating costs of LSPs according to the link costs; and selecting an LSP with a lowest cost to serve as the temporary LSP of the selected to-be-adjusted LSP.

With reference to the fourth possible implementation manner of the first aspect, in a sixth possible implementation manner, the calculating a temporary LSP for the selected to-be-adjusted LSP includes: calculating a total number of bandwidth constraints violated of a link in the network when each of the to-be-adjusted LSPs is adjusted in a next step, where the total number serves as a link cost of the link; calculating costs of LSPs according to the link cost; and selecting an LSP with a lowest cost to serve as the temporary LSP of the selected to-be-adjusted LSP.

With reference to the first aspect, or the first possible implementation manner of the first aspect, or the second possible implementation manner of the first aspect, or the third possible implementation manner of the first aspect, or the fourth possible implementation manner of the first aspect, or the fifth possible implementation manner of the first aspect, or the sixth possible implementation manner of the first aspect, in a seventh possible implementation manner, the rerouting sequence planning method further includes: after the to-be-adjusted LSP is adjusted to a corresponding final-state LSP or temporary LSP, when a to-be-postprocessed list still stores a temporary LSP and an unsuccessfully adjusted to-be-adjusted LSP, using the temporary LSP and the unsuccessfully adjusted to-be-adjusted LSP in the to-be-postprocessed list as new to-be-adjusted LSPs, and performing a step of calculating reference values of the to-be-adjusted label switched paths LSPs.

With reference to the seventh possible implementation manner of the first aspect, in an eighth possible implementation manner, after the using the temporary LSP and the unsuccessfully adjusted to-be-adjusted LSP in the to-be-postprocessed list as new to-be-adjusted LSPs, the method includes: stopping adjustment when the number of iterations of adjusting the to-be-adjusted LSPs reaches a preset maximum value; and when the number of iterations of adjusting the to-be-adjusted LSPs does not reach the preset maximum value, performing a step of the calculating the reference values of the to-be-adjusted label switched paths LSPs.

A second aspect of the present application provides a rerouting sequence planning system, including:

a calculating unit, configured to calculate reference values of to-be-adjusted label switched paths LSPs, where the reference values are used to denote adjusted priorities of the to-be-adjusted LSPs;

a selecting unit, configured to select a to-be-adjusted LSP with a highest priority from the to-be-adjusted LSPs;

a determining unit, configured to determine, according to a critical value of the reference values of the to-be-adjusted LSPs and a reference value of the to-be-adjusted LSP with the highest priority, whether the to-be-adjusted LSP with the highest priority is suitable for adjustment, where the critical value of the reference values of the to-be-adjusted LSPs denotes a minimum reference value required for a to-be-adjusted LSP to be adjusted to a final-state LSP; and an adjusting unit, configured to: when the to-be-adjusted LSP with the highest priority is suitable for adjustment, adjust the to-be-adjusted LSP with the highest priority to a corresponding final-state LSP; and when the to-be-adjusted LSP with the highest priority is not suitable for adjustment, select at least one to-be-adjusted LSP and adjust the at least one selected to-be-adjusted LSP to a corresponding temporary LSP.

With reference to the first aspect, in a first possible implementation manner, the reference value calculating unit includes: a first calculating unit, configured to calculate remaining capacities of links that are in a final-state LSP and do not coincide with those in a to-be-adjusted LSP; a second calculating unit, configured to obtain link reference values according to the remaining capacities and a bandwidth of the to-be-adjusted LSP; and a first selecting unit, configured to select a smallest link reference value to serve as a reference value of the to-be-adjusted LSP.

With reference to the second aspect, in a second possible implementation manner, the calculating unit includes: a third calculating unit, configured to calculate reserved capacities and total capacities of links that are in a final-state LSP and do not coincide with those in a to-be-adjusted LSP; a fourth calculating unit, configured to obtain link reference values according to a bandwidth of the to-be-adjusted LSP, the reserved capacities and the total capacities; and a second selecting unit, configured to calculate a negative value of a largest link reference value to serve as a reference value of the to-be-adjusted LSP.

With reference to the second aspect, or the first possible implementation manner of the second aspect, or the second possible implementation manner of the second aspect, in a third possible implementation manner, the adjusting unit specifically includes: a first adjusting unit and a second adjusting unit, where the first adjusting unit is configured to: when the to-be-adjusted LSP with the highest priority is suitable for adjustment, adjust the to-be-adjusted LSP with the highest priority to a corresponding final-state LSP; and the second adjusting unit includes: a first selecting unit, configured to select at least one to-be-adjusted LSP from the to-be-adjusted LSPs; a second selecting unit, configured to calculate a temporary LSP for the selected to-be-adjusted LSP; and a temporary LSP adjusting unit, configured to adjust the selected to-be-adjusted LSP to the temporary LSP.

With reference to the third possible implementation manner of the second aspect, in a fourth possible implementation manner, the second selecting unit includes: a first capacity calculating unit, configured to calculate remaining capacities of links in a network; a first link cost calculating unit, configured to calculate link costs of the links according to the remaining capacities; a first cost calculating unit, configured to calculate costs of LSPs according to the link costs; and a first temporary LSP selecting unit, configured to select an LSP with a lowest cost to serve as the temporary LSP of the selected to-be-adjusted LSP.

With reference to the third possible implementation manner of the second aspect, in a fifth possible implementation manner, the second selecting unit includes: a second link cost calculating unit, configured to calculate a total number of bandwidth constraints violated of a link in the network when each of the to-be-adjusted LSPs is adjusted in a next step, where the total number serves as a link cost of the link; a second cost calculating unit, configured to calculate costs of LSPs according to the link cost; and a second temporary LSP selecting unit, configured to select an LSP with a lowest cost to serve as the temporary LSP of the selected to-be-adjusted LSP.

With reference to any one of the first possible implementation manner to the fifth possible implementation manner of the second aspect, in a sixth possible implementation manner, the rerouting sequence planning system further includes: an iterating unit, configured to: after the to-be-adjusted LSP is adjusted to a corresponding final-state LSP or temporary LSP, when a to-be-post processed list still stores a temporary LSP and an unsuccessfully adjusted to-be-adjusted LSP, use the temporary LSP and the unsuccessfully adjusted to-be-adjusted LSP in the to-be-post processed list as new to-be-adjusted LSPs.

In the embodiments of the present application, reference values of all to-be-adjusted LSPs are calculated, where the reference values are used to denote adjustment priorities of the to-be-adjusted LSPs; a to-be-adjusted LSP with a highest priority is selected from the to-be-adjusted LSPs, and, according to a critical value of the reference values of the to-be-adjusted LSPs and a reference value of the to-be-adjusted LSP with the highest priority, whether the to-be-adjusted LSP with the highest priority is suitable for adjustment is determined; if the to-be-adjusted LSP with the highest priority is suitable for adjustment, the to-be-adjusted LSP with the highest priority is adjusted to a corresponding final-state LSP; and if the to-be-adjusted LSP with the highest priority is not suitable for adjustment, at least one to-be-adjusted LSP is selected from the to-be-adjusted LSPs and adjusted to a temporary LSP. Compared with the prior art, in the embodiments of the present application, by calculating the reference values of all to-be-adjusted LSPs and according to the critical value of the reference values of the to-be-adjusted LSPs, whether the to-be-adjusted LSP with the highest priority is suitable for adjustment is determined, thereby improving time performance of a rerouting sequence planning algorithm. In addition, when the to-be-adjusted LSP with the highest priority is not suitable for adjustment, at least one to-be-adjusted LSP is selected and adjusted to a temporary LSP, and then other to-be-adjusted LSPs are processed, thereby improving a success ratio of adjustment in rerouting sequence planning.

BRIEF DESCRIPTION OF THE DRAWINGS

To describe the technical solutions in the embodiments of the present application more clearly, the following briefly introduces the accompanying drawings required for describing the embodiments of the present application. Apparently, the accompanying drawings in the following description show merely some embodiments of the present application, and a person of ordinary skill in the art may still derive other drawings from these accompanying drawings without creative efforts.

FIG. 2-a is a flowchart of a reference value calculation manner according to an embodiment of the present application;

FIG. 2-b is a flowchart of a reference value calculation manner according to another embodiment of the present application;

FIG. 3-a is a schematic flowchart of a rerouting sequence planning method according to another embodiment of the present application;

FIG. 3-b is a schematic flowchart of calculating a temporary LSP according to an embodiment of the present application;

FIG. 3-c is a schematic flowchart of calculating a temporary LSP according to another embodiment of the present application;

FIG. 6 is a schematic structural diagram of a rerouting sequence planning system according to an embodiment of the present application;

FIG. 7-a is a schematic structural diagram of a rerouting sequence planning system according to another embodiment of the present application;

FIG. 7-b is a schematic structural diagram of a rerouting sequence planning system according to another embodiment of the present application;

FIG. 7-c is a schematic structural diagram of a rerouting sequence planning system according to another embodiment of the present application;

FIG. 8-a is a schematic structural diagram of a rerouting sequence planning system according to another embodiment of the present application;

FIG. 8-b is a schematic structural diagram of a rerouting sequence planning system according to another embodiment of the present application;

DETAILED DESCRIPTION

The following clearly describes the technical solutions in the embodiments of the present application with reference to the accompanying drawings in the embodiments of the present application. Apparently, the described embodiments are merely a part rather than all of the embodiments of the present application. All other embodiments obtained by a person of ordinary skill in the art based on the embodiments of the present application without creative efforts shall fall within the protection scope of the present application.

The embodiments of the present application provide a rerouting sequence planning method and system, so as to improve time performance of a rerouting sequence planning algorithm and a success ratio of adjustment.

Figure 1:
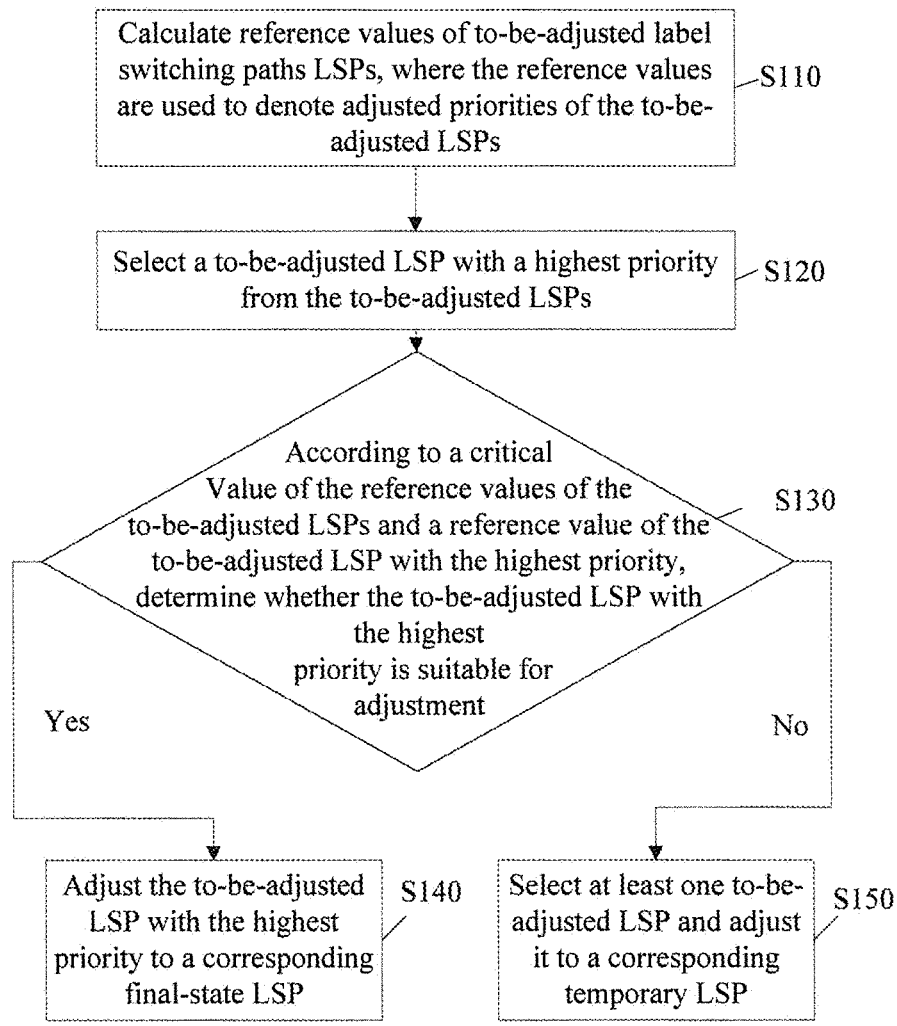
FIG. 1 is a schematic diagram of a basic process of a rerouting sequence planning method according to an embodiment of the present application.

As shown in FIG. 1, a rerouting sequence planning method may include the following:

S110: Calculate reference values of to-be-adjusted label switched paths LSPs, where the reference values are used to denote adjusted priorities of the to-be-adjusted LSPs.

Understandably, the to-be-adjusted label switched paths (Label Switched Path, LSP for short) are a group of LSPs that have not been adjusted to final-state LSPs. In adjusting all to-be-adjusted LSPs in this embodiment of the present application, the adjustment is performed according to an order of adjusted priorities of the to-be-adjusted LSPs. The reference values (Reference Value, RV for short) provided in this embodiment of the present application not only directly reflect whether the to-be-adjusted LSPs are adjustable, but also specially denote adjustable priorities of the to-be-adjusted LSPs.

S120. Select a to-be-adjusted LSP with a highest priority from the to-be-adjusted LSPs.

RVs are obtained according to the calculation in the foregoing S110, and the to-be-adjusted LSP with the highest priority is selected from all the to-be-adjusted LSPs according to the RVs.

The RVs denote adjustable priorities of the to-be-adjusted LSPs. A larger RV may denote a higher priority, or a smaller RV may denote a higher priority, and then a to-be-adjusted LSP with a largest RV or a to-be-adjusted LSP with a smallest RV may be selected.

S130. Determine, according to a critical value of the reference values of the to-be-adjusted LSPs and a reference value of the to-be-adjusted LSP with the highest priority, whether the to-be-adjusted LSP with the highest priority is suitable for adjustment, where the critical value of the reference values of the to-be-adjusted LSPs denotes a minimum reference value required for a to-be-adjusted LSP to be adjusted to a final-state LSP; if the to-be-adjusted LSP with the highest priority is suitable for adjustment, perform S140; and if the to-be-adjusted LSP with the highest priority is not suitable for adjustment, perform S150.

Understandably, the RVs denote the priorities of the to-be-adjusted LSPs, and the RV values also directly reflect whether the to-be-adjusted LSPs are adjustable. If the RV of any to-be-adjusted LSP denotes that the LSP is just adjustable, a minimum RV that needs to be satisfied for being just adjustable is a critical value of the to-be-adjusted LSP. That is, the critical value is a boundary value that defines whether the to-be-adjusted LSP is adjustable or non-adjustable. If the RV of the to-be-adjusted LSP is equal to the critical value or greater than the critical value, it indicates that the to-be-adjusted LSP is adjustable; and if the RV of the to-be-adjusted LSP is less than the critical value, it indicates that the to-be-adjusted LSP is non-adjustable. Certainly, if the RV value of the selected to-be-adjusted LSP with the highest priority is less than the critical value, it indicates that all the to-be-adjusted LSPs are non-adjustable.

S140. Adjust the to-be-adjusted LSP with the highest priority to a corresponding final-state LSP.

Understandably, when it is determined, according to the critical value of the RVs of the to-be-adjusted LSPs, that the to-be-adjusted LSP with the highest priority is adjustable, the to-be-adjusted LSP with the highest priority is adjusted to a corresponding final-state LSP.

S150. Select at least one to-be-adjusted LSP and adjust the at least one selected to-be-adjusted LSP to a corresponding temporary LSP.

When it is determined, according to the critical value of the RVs of the to-be-adjusted LSPs, that the to-be-adjusted LSP with the highest priority is non-adjustable, in this embodiment of the present application, the following practice is used: at least one to-be-adjusted LSP is selected from the to-be-adjusted LSPs, and a corresponding temporary LSP is calculated for the selected to-be-adjusted LSP, and then the selected to-be-adjusted LSP is adjusted to the temporary LSP separately.

In this embodiment of the present application, RVs of to-be-adjusted LSPs are calculated, where the RVs are used to denote adjusted priorities of the to-be-adjusted LSPs; a to-be-adjusted LSP with a highest priority is selected from the to-be-adjusted LSPs, and, according to a critical value of the RVs of the to-be-adjusted LSPs, whether the to-be-adjusted LSP with the highest priority is suitable for adjustment is determined; if the to-be-adjusted LSP with the highest priority is suitable for adjustment, the to-be-adjusted LSP with the highest priority is adjusted to a corresponding final-state LSP; and if the to-be-adjusted LSP with the highest priority is not suitable for adjustment, it indicates that other to-be-adjusted LSPs are also unsuitable for adjustment, and at least one to-be-adjusted LSP is selected from the to-be-adjusted LSPs and adjusted to a temporary LSP, so that other to-be-adjusted LSPs may be adjusted first next time, thereby improving a success ratio of adjustment and time performance of an algorithm.

As an optional embodiment, as shown in FIG. 2-a, the foregoing S110 may specifically include the following:

S2110. Calculate remaining capacities of links that are in a final-state LSP and do not coincide with those in a to-be-adjusted LSP.

S2120. Obtain link reference values according to the remaining capacities and a bandwidth of the to-be-adjusted LSP.

S2130. Select a smallest link reference value to serve as a reference value of the to-be-adjusted LSP.

Specifically, in the RV calculation method provided in this embodiment of the present application, remaining capacities of links that are in the final-state LSP and do not coincide with those in the to-be-adjusted LSP may be calculated, and then a difference between a remaining capacity of each non-coincident link and a bandwidth of the to-be-adjusted LSP is calculated, so that the difference serves as a link reference value of each non-coincident link. A smallest link reference value is selected from calculated link reference values to serve as the RV of the to-be-adjusted LSP.

It is assumed that Q denotes the final-state LSP, P denotes the to-be-adjusted LSP, e denotes a link that is in the final-state LSP and does not coincide with that in the to-be-adjusted LSP, RC(e) denotes a remaining capacity of the link that is in the final-state LSP and does not coincide with those in the to-be-adjusted LSP, and BW denotes the bandwidth of the to-be-adjusted LSP, so that it can be learned from the foregoing description that a calculation formula of the RV of the to-be-adjusted LSP is as follows:

$$RV = \mathrm{MIN}_{e \in Q \setminus P}\{RC(e) - BW\} \qquad \text{Formula 1}$$

Alternatively, the remaining capacities of the links that are in the final-state LSP and do not coincide with those in the to-be-adjusted LSP are calculated, and then a link with a smallest remaining capacity is selected, and a difference between the remaining capacity of the link and the bandwidth of the to-be-adjusted LSP is calculated to obtain the RV of the to-be-adjusted LSP.

Similarly, it is assumed that Q denotes the final-state LSP, P denotes the to-be-adjusted LSP, e denotes a link that is in the final-state LSP and does not coincide with that in the to-be-adjusted LSP, RC(e) denotes a remaining capacity of the link that is in the final-state LSP and does not coincide with those in the to-be-adjusted LSP, and BW denotes the bandwidth of the to-be-adjusted LSP, so that it can be learned from the foregoing description that a calculation formula of the RV of the to-be-adjusted LSP is as follows:

$$RV = \mathrm{MIN}_{e \in Q \setminus P} RC(e) - BW \qquad \text{Formula 2}$$

Understandably, the links that are in the final-state LSP and do not coincide with those in the to-be-adjusted LSP are links which exist in the final-state LSP but do not exist in the to-be-adjusted LSP. If the remaining capacity of the link with the smallest remaining capacity among the non-coincident links is equal to or greater than the bandwidth of the to-be-adjusted LSP, it indicates that each link in the final-state LSP is capable of receiving the to-be-adjusted LSP. Therefore, the difference between the link and the bandwidth of the to-be-adjusted LSP is greater than or equal to 0, that is, the RV of the to-be-adjusted LSP is equal to or greater than 0.

For example, there are a to-be-adjusted LSP1 and a corresponding final-state LSP2, where a link of the LSP1 is AB-BC-CD-DF, and a link of the LSP2 is AB-BD-DE-EF. Therefore, links that are in the final-state LSP2 and do not coincide with those in the to-be-adjusted LSP1 are BD, DE, and EF, where the remaining capacity of BD is 80 M, the remaining capacity of DE is 100 M, the remaining capacity of EF is 90 M, and the bandwidth of the to-be-adjusted LSP1 is 100 M. Therefore, according to the foregoing Formula 1, three link reference values: −20 M, 0, and −10 M, may be obtained, and further, the RV of the to-be-adjusted LSP is −20 M. According to the foregoing Formula 2, the smallest remaining capacity of the three non-coincident links is 80 M. Therefore, a difference between 80 M and the bandwidth 100 M of the to-be-adjusted LSP is −20 M, and further, the RV of the to-be-adjusted LSP is −20 M.

As another optional embodiment, as shown in FIG. 2-b, the foregoing S110 may specifically include the following:

S2210. Calculate reserved capacities and total capacities of links that are in a final-state LSP and do not coincide with those in a to-be-adjusted LSP.

S2220. Obtain link reference values according to a bandwidth of the to-be-adjusted LSP, the reserved capacities and the total capacities.

S2230. Calculate a negative value of a largest link reference value to serve as a reference value of the to-be-adjusted LSP.

Specifically, in another optional RV calculation method provided in this embodiment of the present application, reserved capacities and total capacities of links that are in the final-state LSP and do not coincide with those in the to-be-adjusted LSP are calculated, then a sum of reserved capacities of the to-be-adjusted LSP and the non-coincident link is calculated, and the total capacity of the link is subtracted from the sum to obtain a difference. Therefore, the difference serves as a link reference value of the non-coincident link. A largest link reference value is selected from calculated link reference values, and a negative value of the link reference value is calculated to obtain the RV of the to-be-adjusted LSP.

It is assumed that Q denotes the final-state LSP, P denotes the to-be-adjusted LSP, e denotes a link that is in the final-state LSP and does not coincide with that in the to-be-adjusted LSP, R(e) denotes a reserved capacity of the link that is in the final-state LSP and does not coincide with that in the to-be-adjusted LSP, C(e) denotes a total capacity of the link that is in the final-state LSP and does not coincide with that in the to-be-adjusted LSP, and BW denotes the bandwidth of the to-be-adjusted LSP, so that it can be learned from the foregoing description that a calculation formula of the RV of the to-be-adjusted LSP is as follows:

$$RV=-\text{MAX}_{e \in Q \backslash P}\{BW+R(e)-C(e)\} \quad \text{Formula 3}$$

Alternatively, the reserved capacities and total capacities of the links that are in the final-state LSP and do not coincide with those in the to-be-adjusted LSP are calculated, and then a difference between a reserved capacity and a total capacity of each non-coincident link is calculated. A sum of the difference and the bandwidth of the to-be-adjusted LSP serves as a link reference value of the non-coincident link, and then a negative value of a largest reference value is used as the RV of the to-be-adjusted LSP.

Similarly, it is assumed that Q denotes the final-state LSP, P denotes the to-be-adjusted LSP, e denotes a link that is in the final-state LSP and does not coincide with that in the to-be-adjusted LSP, R(e) denotes a reserved capacity of the link that is in the final-state LSP and does not coincide with that in the to-be-adjusted LSP, C(e) denotes a total capacity of the link that is in the final-state LSP and does not coincide with those in the to-be-adjusted LSP, and BW denotes the bandwidth of the to-be-adjusted LSP, so that it can be learned from the foregoing description that a calculation formula of the RV of the to-be-adjusted LSP is as follows:

$$RV=-\text{MAX}_{e \in Q \backslash P}\{BW+(R(e)-C(e))\} \quad \text{Formula 4}$$

For example, there are a to-be-adjusted LSP1 and a corresponding final-state LSP2, where a link of the LSP1 is AB-BC-CD-DF, and a link of the LSP2 is AB-BD-DE-EF. Therefore, links that are in the final-state LSP2 and do not coincide with those in the to-be-adjusted LSP1 are BD, DE, and EF, where the reserved capacity of BD is 10 M and the total capacity is 120 M, the reserved capacity of DE is 15 M and the total capacity is 110 M, the reserved capacity of EF is 10 M and the total capacity is 100 M, and the bandwidth of the to-be-adjusted LSP1 is 100 M. Therefore, according to the foregoing Formula 3 or 4, three link reference values: −10 M, 5 M, and 10 M, may be obtained, and therefore, a largest link reference value 10 M is selected from the three link reference values, and a negative value of the largest link reference value 10 M is used as the RV of the to-be-adjusted LSP.

The technical solutions corresponding to FIG. 2-a and FIG. 2-b are optional RV calculation methods provided in this embodiment of the present application. A person skilled in the art may understand that, apart from the foregoing RV calculation methods, other calculation methods capable of fulfilling technical purposes of the present application all fall within the protection scope of the present application. For example, after the link reference value of each non-coincident link is calculated according to the foregoing Formula 3 and Formula 4, a product of the link reference value and a priority of a service transmitted on the to-be-adjusted LSP is calculated, a greatest product is selected, and a negative value of the greatest product is calculated and used as the RV of the to-be-adjusted LSP. A specific calculation manner is as follows:

$$RV=-\text{MAX}_{e \in Q \backslash P}\{BW+R(e)-c(e)\}*P_{priority}$$

Q denotes the final-state LSP, P denotes the to-be-adjusted LSP, e denotes a link that is in the final-state LSP and does not coincide with that in the to-be-adjusted LSP, R(e) denotes a reserved capacity of the link that is in the final-state LSP and does not coincide with that in the to-be-adjusted LSP, C(e) denotes a total capacity of the link that is in the final-state LSP and does not coincide with that in the to-be-adjusted LSP, BW denotes the bandwidth of the to-be-adjusted LSP, and $P_{priority}$ denotes a priority of a service of the to-be-adjusted LSP.

As an optional embodiment, as shown in FIG. 3-a, the foregoing S140 may include the following:

S310. Select at least one to-be-adjusted LSP from the to-be-adjusted LSPs.

S320. Calculate a temporary LSP for the selected to-be-adjusted LSP.

S330. Adjust the selected to-be-adjusted LSP to the temporary LSP.

When the to-be-adjusted LSP with the highest priority is not suitable for adjustment, it indicates other to-be-adjusted LSPs are not suitable for adjustment in a current link scenario. Therefore, at least one to-be-adjusted LSP is selected from the to-be-adjusted LSPs and adjusted to a temporary LSP, so that other to-be-adjusted LSPs are adjusted first by adjusting away some to-be-adjusted LSPs.

Optionally, according to importance of a transmitted service, a to-be-adjusted LSP that transmits an unimportant service may be selected to be adjusted to the temporary LSP first.

Optionally, a to-be-adjusted LSP with a relatively large bandwidth may be adjusted to the temporary LSP first.

A constrained shortest path first (Constrained Shortest Path First, CSPF for short) algorithm may be used to calculate the corresponding temporary LSP for the to-be-adjusted LSP that is selected to be adjusted to the temporary LSP.

As an optional implementation manner, as shown in FIG. 3-b, the foregoing S320 specifically includes the following:

S3211. Calculate remaining capacities of links in a network.

S3212. Calculate link costs of the links according to the remaining capacities.

S3213. Calculate costs of LSPs according to the link costs.

S3214. Select an LSP with a lowest cost to serve as the temporary LSP of the selected to-be-adjusted LSP.

A remaining capacity of each link in a network is calculated, and then a link cost Link Cost of each link is calculated according to the remaining capacity. A cost of an LSP may be obtained according to the link cost Link Cost of each link in the LSP, and then an LSP with a lowest cost is selected as the temporary LSP of the to-be-adjusted LSP.

Specifically, the link cost may be calculated according to a formula: Link Cost=1/R(L), where R(L) is the remaining capacity of the link.

As another optional implementation manner, as shown in FIG. 3-c, the foregoing S320 specifically includes the following:

S3221. Calculate a total number of bandwidth constraints violated of a link in a network when each of the to-be-adjusted LSPs is adjusted in a next step, where the total number serves as a link cost of the link.

S3222. Calculate costs of LSPs according to the link cost.

S3223. Select an LSP with a lowest cost to serve as the temporary LSP of the selected to-be-adjusted LSP.

A total number of bandwidth constraints violated of a link in the network when the to-be-adjusted LSP is adjusted in a next step is calculated, where the total number serves as a link cost of the link. A calculation formula is:

$$\text{Link Cost} = N_{Link\ Tight\ Degree}, \text{ where}$$

$N_{Link\ Tight\ Degree}$ is the total number of the bandwidth constraints violated of the link.

According to the link cost Link Cost of each link in an LSP, the cost of the LSP may be obtained, and then an LSP with a lowest cost is selected as a temporary LSP of the to-be-adjusted LSP.

Certainly, the temporary LSP may be calculated in other methods than the two calculation methods enumerated above. For example, if the link cost is Link Cost, the link cost of each link, which is used to calculate the cost of an LSP, is Link Cost=1/Link Cost, and then the cost of the LSP is calculated according to 1/Link Cost of each link. An LSP with a lowest cost is selected as a temporary LSP of the to-be-adjusted LSP. Therefore, the method for calculating the temporary LSP is not limited herein.

Figure 4:
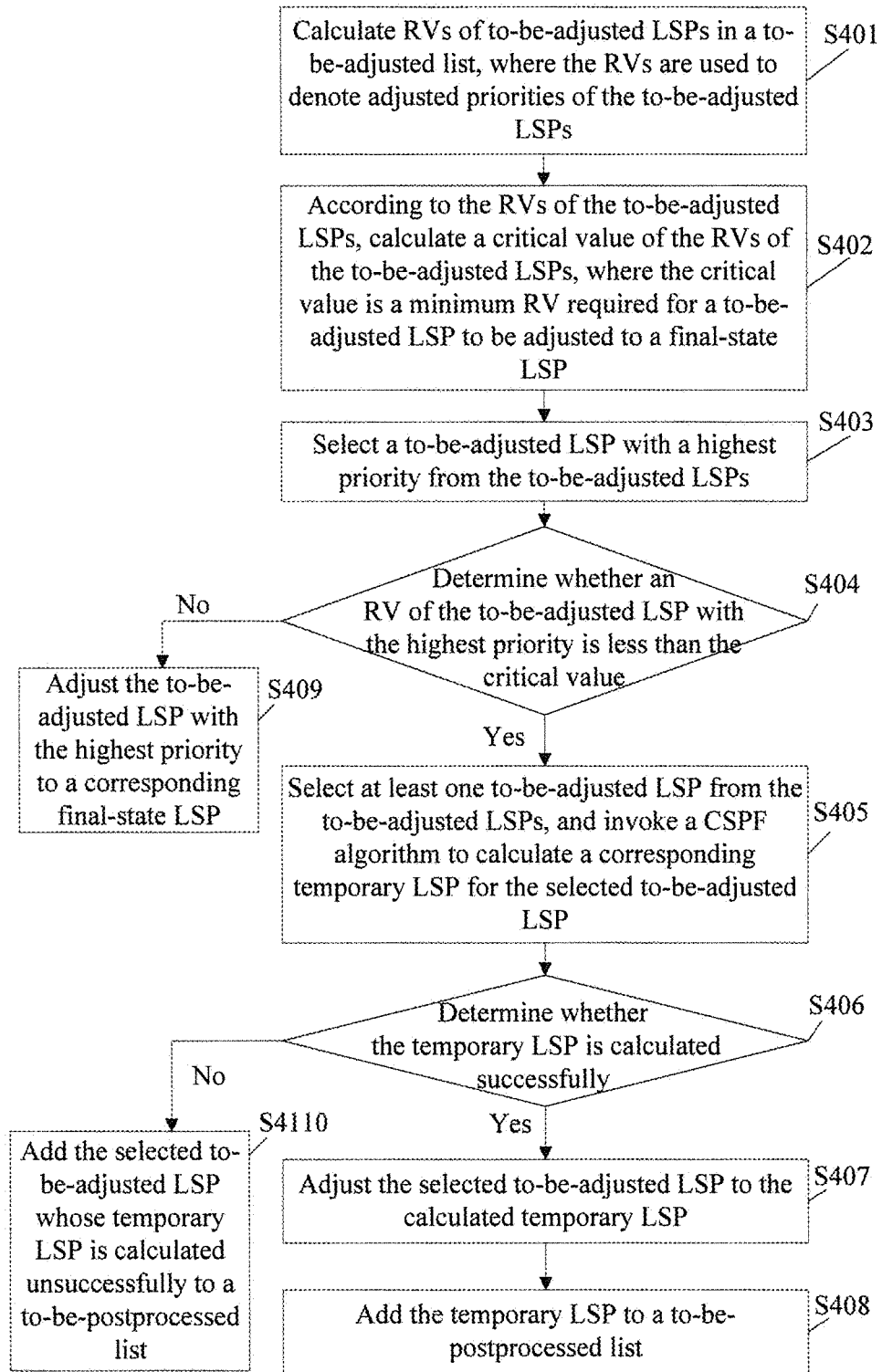
FIG. 4 is a schematic flowchart of a rerouting sequence planning method according to another embodiment of the present application.

As shown in FIG. 4, which shows another embodiment based on the rerouting sequence planning method provided in FIG. 1, including:

S401: Calculate RVs of to-be-adjusted LSPs in a to-be-adjusted list, where the RVs are used to denote adjusted priorities of the to-be-adjusted LSPs.

Understandably, the to-be-adjusted list stores to-be-adjusted LSPs that have not been adjusted, and the to-be-adjusted LSPs are a group of LSPs that have not been adjusted to final-state LSPs. In adjusting all to-be-adjusted LSPs in this embodiment of the present application, the adjustment is performed according to an order of adjusted priorities of the to-be-adjusted LSPs. The RVs provided in this embodiment of the present application not only directly reflect whether the to-be-adjusted LSPs are adjustable, but also specially denote adjustable priorities of the to-be-adjusted LSPs.

S402. According to the RVs of the to-be-adjusted LSPs, calculate a critical value of the RVs of the to-be-adjusted LSPs, where the critical value is a minimum RV required for a to-be-adjusted LSP to be adjusted to a final-state LSP.

Understandably, the RVs denote the priorities of the to-be-adjusted LSPs, and the RV values also directly reflect whether the to-be-adjusted LSPs are adjustable. If the RV of any to-be-adjusted LSP denotes that the LSP is just adjustable, a minimum RV that needs to be satisfied for being just adjustable is a critical value of the to-be-adjusted LSP. That is, the critical value is a boundary value that defines whether the to-be-adjusted LSP is adjustable or non-adjustable. If the RV of the to-be-adjusted LSP is equal to the critical value or greater than the critical value, it indicates that the to-be-adjusted LSP is adjustable; and if the RV of the to-be-adjusted LSP is less than the critical value, it indicates that the to-be-adjusted LSP is non-adjustable. Certainly, if the RV value of the selected to-be-adjusted LSP with the highest priority is less than the critical value, it indicates that all the to-be-adjusted LSPs are non-adjustable.

S403. Select a to-be-adjusted LSP with a highest priority from the to-be-adjusted LSPs.

RVs are obtained according to the calculation in the foregoing S110, and the to-be-adjusted LSP with the highest priority is selected from all the to-be-adjusted LSPs according to the RVs.

The RVs denote adjustable priorities of the to-be-adjusted LSPs. A larger RV may denote a higher priority, or a smaller RV may denote a higher priority, and then a to-be-adjusted LSP with a largest RV or a to-be-adjusted LSP with a smallest RV may be selected.

S404. Determine whether an RV of the to-be-adjusted LSP with the highest priority is less than the critical value; if the RV of the to-be-adjusted LSP with the highest priority is less than the critical value, perform S405; and if the RV of the to-be-adjusted LSP with the highest priority is not less than the critical value, perform S409.

Understandably, the critical value is a minimum value required for a to-be-adjusted LSP to be adjusted to a final-state LSP. When the to-be-adjusted LSP is less than the critical value, it indicates that the to-be-adjusted LSP is non-adjustable.

S405. Select at least one to-be-adjusted LSP from the to-be-adjusted LSPs, and invoke a CSPF algorithm to calculate a corresponding temporary LSP for the selected to-be-adjusted LSP.

After it is determined, according to the RV of the selected to-be-adjusted LSP with the highest priority and the critical value, that the to-be-adjusted LSP with the highest priority is non-adjustable, at least one to-be-adjusted LSP is selected from all the to-be-adjusted LSPs, and a CSRF algorithm is invoked to calculate a temporary LSP for each selected to-be-adjusted LSP. The at least one to-be-adjusted LSP is adjusted to the temporary LSP, so that other to-be-adjusted LSPs may be adjusted.

Optionally, according to importance of a transmitted service, a to-be-adjusted LSP that transmits an unimportant service may be selected to be adjusted to the temporary LSP first.

Optionally, a to-be-adjusted LSP with a relatively large bandwidth may be adjusted to the temporary LSP first.

A constrained shortest path first (Constrained Shortest Path First, CSPF for short) algorithm may be used to calculate the corresponding temporary LSP for the to-be-adjusted LSP that is selected to be adjusted to the temporary LSP.

As an optional implementation manner, a remaining capacity of each link in a network is calculated, and then a link cost Link Cost of each link is calculated according to the remaining capacity. Then, a sum of link costs Link Costs of all links of the LSP is calculated to serve as the cost of the LSP, and then an LSP with a lowest cost is selected as the temporary LSP of the to-be-adjusted LSP.

Specifically, the link cost may be calculated according to a formula: Link Cost=1/R(L), where R(L) is the remaining capacity of the link.

As another optional implementation manner, a total number of bandwidth constraints violated of a link in the network when the to-be-adjusted LSP is adjusted in a next step is calculated, where the total number serves as a link cost of the link. A calculation formula is:

Link Cost=$N_{Link\ Tight\ Degree}$, where $N_{Link\ Tight\ Degree}$ is the total number of the bandwidth constraints violated of the link.

Then, a sum of link costs Link Costs of all links of the LSP is calculated to serve as the cost of the LSP, and then an LSP with a lowest cost is selected as the temporary LSP of the to-be-adjusted LSP.

Certainly, the temporary LSP may be calculated in other methods than the two calculation methods enumerated above. For example, if the link cost is Link Cost, the link cost of each link, which is used to calculate the cost of an LSP, is Link Cost=1/Link Cost, and then a sum of link costs 1/Link Cost of all links of the LSP is calculated to serve as the cost of the LSP. An LSP with a lowest cost is selected as a temporary LSP of the to-be-adjusted LSP. Therefore, the method for calculating the temporary LSP is not limited in this embodiment of the present application.

S406. Determine whether the temporary LSP is calculated successfully; if the temporary LSP is calculated successfully, perform S407; and if the temporary LSP is calculated unsuccessfully, perform S410.

S407. Adjust the selected to-be-adjusted LSP to the calculated temporary LSP.

After the temporary LSP is calculated for the selected to-be-adjusted LSP, the selected to-be-adjusted LSP is adjusted to the temporary LSP.

S408. Add the temporary LSP to a to-be-postprocessed list.

Understandably, after the to-be-adjusted LSP is adjusted to the temporary LSP, the temporary LSP is added to a to-be-postprocessed list.

S409. Adjust the to-be-adjusted LSP with the highest priority to a corresponding final-state LSP.

S410. Add the selected to-be-adjusted LSP whose temporary LSP is calculated unsuccessfully to the to-be-postprocessed list.

If the temporary LSP is calculated unsuccessfully for the to-be-adjusted LSP, the to-be-adjusted LSP is added to the to-be-postprocessed list.

In this embodiment of the present application, RVs of to-be-adjusted LSPs in a to-be-adjusted list and a critical value of the RVs of the to-be-adjusted LSPs are calculated, where the RVs are used to denote adjusted priorities of the to-be-adjusted LSPs. A to-be-adjusted LSP with a highest priority is selected from the to-be-adjusted LSPs. If it is determined that an RV of the to-be-adjusted LSP with the highest priority is less than the critical value, at least one to-be-adjusted LSP is selected from the to-be-adjusted LSPs and adjusted to a temporary LSP calculated for it, so that some adjustable to-be-adjusted LSPs can be adjusted instead, thereby improving an adjustment success ratio of a rerouting sequence planning algorithm. If it is determined that the RV of the to-be-adjusted LSP with the highest priority is greater than or equal to the critical value, the to-be-adjusted LSP with the highest priority is directly adjusted to a corresponding final-state LSP.

Figure 5:
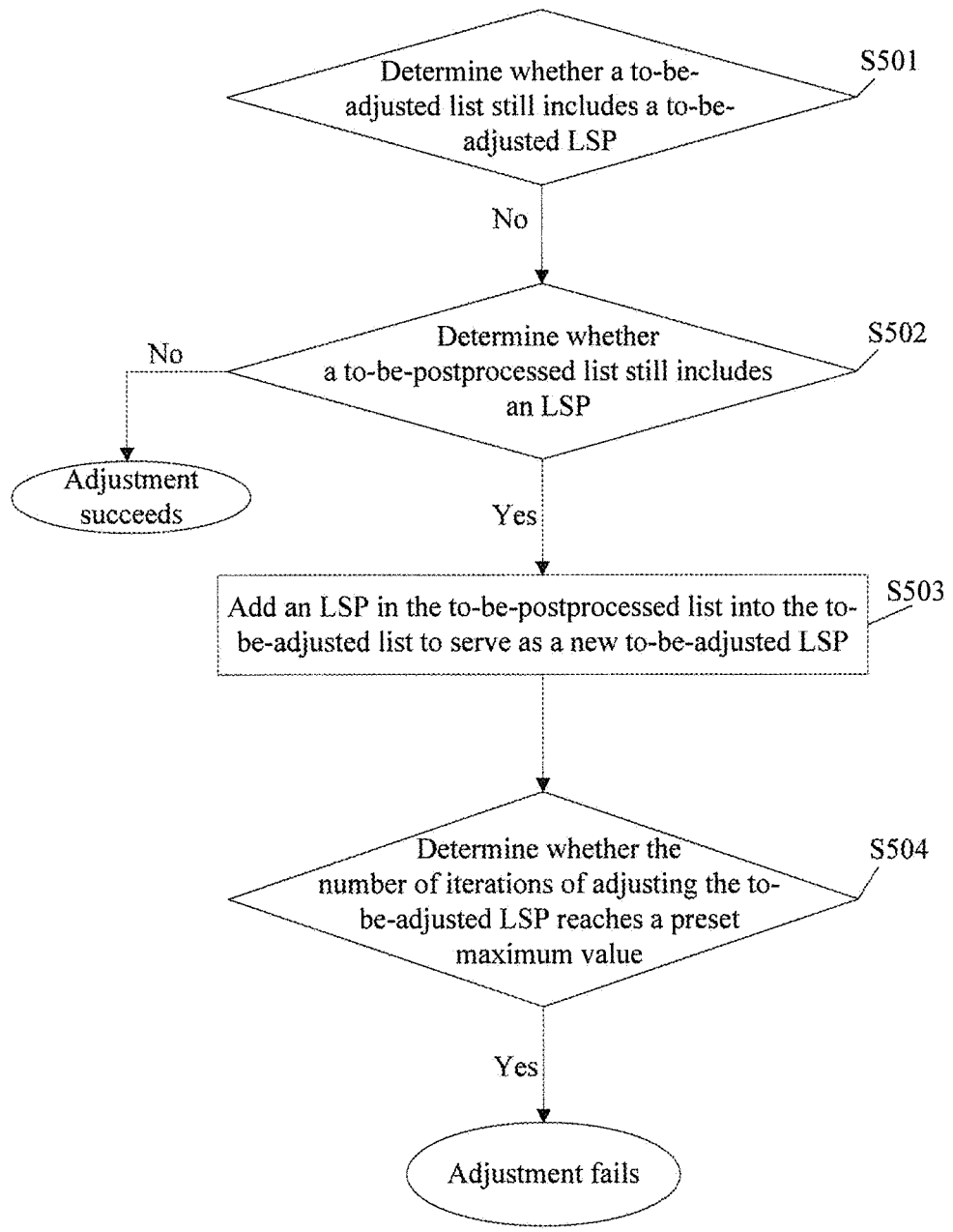
FIG. 5 is a schematic flowchart of a rerouting sequence planning method according to another embodiment of the present application.

Further, as shown in FIG. 5, a rerouting sequence planning method includes the following:

S501. Determine whether a to-be-adjusted list still includes a to-be-adjusted LSP; and if not, perform S502.

In the rerouting sequence planning method provided in FIG. 4, the unsuccessfully adjusted to-be-adjusted LSP and the temporary LSP are added into the to-be-postprocessed list, and LSPs in the to-be-postprocessed list are LSPs that are to be adjusted after the to-be-adjusted LSPs in the to-be-adjusted list are processed. Therefore, after the foregoing operations are performed for a to-be-adjusted LSP in the to-be-adjusted list repeatedly, the LSP is adjusted to the final-state LSP or placed into the to-be-postprocessed list, and then the LSP in the to-be-postprocessed list is added into the to-be-adjusted list, for which the operations provided in FIG. 4 are performed repeatedly.

S502. Determine whether a to-be-postprocessed list still includes an LSP; if the to-be-postprocessed list still includes an LSP, perform S503; and if the to-be-postprocessed list includes no LSP, the adjustment succeeds.

S503. Add the LSP in the to-be-postprocessed list into the to-be-adjusted list to serve as a new to-be-adjusted LSP.

If the to-be-postprocessed list still includes an LSP, the LSP is added into the to-be-adjusted LSPs to serve as a new to-be-adjusted LSP, so that calculation and adjustment are performed again for the to-be-adjusted LSP that is newly added into the to-be-adjusted list.

S503. Determine whether the number of iterations of adjusting the to-be-adjusted LSP reaches a preset maximum value; if the number of iterations of adjusting the to-be-adjusted LSP reaches the preset maximum value, the adjustment fails; and if the number of iterations of adjusting the to-be-adjusted LSP does not reach the preset maximum value, the adjustment continues.

Certainly, in a process of adjusting the to-be-adjusted LSPs, some to-be-adjusted LSPs may be non-adjustable all the time, which causes an adjustment algorithm to get into an endless loop. Therefore, a maximum value of the number of iterations of the adjustment algorithm may be preset. Once the number of iterations of adjustment reaches the preset maximum value, the adjustment is stopped to avoid a system crash.

In this embodiment of the present application, after a to-be-adjusted LSP in a to-be-adjusted list is adjusted to a temporary LSP or a final-state LSP, if a to-be-postprocessed list still stores an LSP, the LSP in the to-be-postprocessed list is added into the to-be-adjusted list to serve as a new to-be-adjusted LSP, and a solution provided in a foregoing embodiment is executed repeatedly to adjust the to-be-adjusted LSP in the to-be-adjusted list. When it is determined that the number of iterations of adjustment reaches a preset maximum value, the adjustment stops and the adjustment fails. After the adjustment steps provided in the foregoing embodiment are performed repeatedly, if the number of iterations of adjustment does not reach the preset maximum value and the to-be-postprocessed list includes no LSP, it indicates that the adjustment succeeds.

As shown in FIG. 6, an embodiment of the present application further provides a rerouting sequence planning system 600, which may include:

a calculating unit 610, configured to calculate reference values of to-be-adjusted label switched paths LSPs, where the reference values are used to denote adjusted priorities of the to-be-adjusted LSPs;

a selecting unit 620, configured to select a to-be-adjusted LSP with a highest priority from the to-be-adjusted LSPs;

a determining unit 630, configured to determine, according to a critical value of the reference values of the to-be-adjusted LSPs and a reference value of the to-be-adjusted LSP with the highest priority, whether the to-be-adjusted LSP with the highest priority is suitable for adjustment, where the critical value of the reference values of the to-be-adjusted LSPs denotes a minimum reference value required for a to-be-adjusted LSP to be adjusted to a final-state LSP; and an adjusting unit 640, configured to: when the to-be-adjusted LSP with the highest priority is suitable for adjustment, adjust the to-be-adjusted LSP with the highest priority to a corresponding final-state LSP; and when the to-be-adjusted LSP with the highest priority is not suitable for adjustment, select at least one to-be-adjusted LSP and adjust the at least one selected to-be-adjusted LSP to a corresponding temporary LSP.

The calculating unit 610 calculates reference values of all to-be-adjusted LSPs, where the reference values are used to denote adjusted priorities of the to-be-adjusted LSPs. Subsequently, the selecting unit 620 selects a to-be-adjusted LSP with a highest priority from all the to-be-adjusted LSPs. According to the reference value of the to-be-adjusted LSP with the highest priority and the critical value of the reference values of the to-be-adjusted LSPs, the determining unit 630 determines whether the to-be-adjusted LSP with the highest priority is suitable for adjustment. When it is determined that the to-be-adjusted LSP with the highest priority is suitable for adjustment, the adjusting unit 640 adjusts the to-be-adjusted LSP with the highest priority to a corresponding final-state LSP. When it is determined that the to-be-adjusted LSP with the highest priority is not suitable for adjustment, the adjusting unit 640 selects at least one to-be-adjusted LSP from the to-be-adjusted LSPs for being adjusted to a corresponding temporary LSP, thereby effectively improving time performance of a rerouting sequence planning algorithm and a success ratio of adjustment.

Optionally, the selecting unit 620 selects a to-be-adjusted LSP with a largest reference value from the to-be-adjusted LSPs; or selects a to-be-adjusted LSP with a smallest reference value from the to-be-adjusted LSPs.

As an optional implementation manner, as shown in FIG. 7-*a*, the calculating unit 610 may include:

a first calculating unit 7110, configured to calculate remaining capacities of links that are in a final-state LSP and do not coincide with those in a to-be-adjusted LSP;

a second calculating unit 7120, configured to obtain link reference values according to the remaining capacities and a bandwidth of the to-be-adjusted LSP; and a first selecting unit 7130, configured to select a smallest link reference value to serve as a reference value of the to-be-adjusted LSP.

Specifically, remaining capacities of links that are in the final-state LSP and do not coincide with those in the to-be-adjusted LSP are calculated, and then a difference between a remaining capacity of each non-coincident link and a bandwidth of the to-be-adjusted LSP is calculated, so that the difference serves as a link reference value of each non-coincident link. A smallest link reference value is selected from calculated link reference values to serve as the RV of the to-be-adjusted LSP.

As an optional implementation manner, as shown in FIG. 7-*b*, the calculating unit 610 may include:

a third calculating unit 7210, configured to calculate reserved capacities and total capacities of links that are in a final-state LSP and do not coincide with those in a to-be-adjusted LSP;

a fourth calculating unit 7220, configured to obtain link reference values according to a bandwidth of the to-be-adjusted LSP, the reserved capacities and the total capacities; and a second selecting unit 7230, configured to calculate a negative value of a largest link reference value to serve as a reference value of the to-be-adjusted LSP.

Specifically, in another optional RV calculation method provided in this embodiment of the present application, reserved capacities and total capacities of links that are in the final-state LSP and do not coincide with those in the to-be-adjusted LSP are calculated, then a sum of reserved capacities of the to-be-adjusted LSP and the non-coincident link is calculated, and the total capacity of the link is subtracted from the sum to obtain a difference. Therefore, the difference serves as a link reference value of the non-coincident link. A largest link reference value is selected from calculated link reference values, and a negative value of the link reference value is calculated to obtain the RV of the to-be-adjusted LSP.

As an optional implementation manner, as shown in FIG. 7-*c*, the adjusting unit 640 specifically includes a first adjusting unit 7310 and a second adjusting unit 7320.

The first adjusting unit 7310 is configured to: when the to-be-adjusted LSP with the highest priority is suitable for adjustment, adjust the to-be-adjusted LSP with the highest priority to a corresponding final-state LSP.

The second adjusting unit 7320 may include:

a first selecting unit 7321, configured to select at least one to-be-adjusted LSP from the to-be-adjusted LSPs;

a second selecting unit 7322, configured to calculate a temporary LSP for the selected to-be-adjusted LSP; and a temporary LSP adjusting unit 7323, configured to adjust the selected to-be-adjusted LSP to the temporary LSP.

Optionally, as shown in FIG. 8-*a*, the second selecting unit 7322 may include:

a first capacity calculating unit 8110, configured to calculate remaining capacities of links in a network;

a first link cost calculating unit 8120, configured to calculate link costs of the links according to the remaining capacities;

a first cost calculating unit 8130, configured to calculate costs of LSPs according to the link costs; and a first temporary LSP selecting unit 8140, configured to select an LSP with a lowest cost to serve as the temporary LSP of the selected to-be-adjusted LSP.

Optionally, as shown in FIG. 8-*b*, the second selecting unit 7322 may include:

a second link cost calculating unit 8210, configured to calculate a total number of bandwidth constraints violated of a link in the network when each of the to-be-adjusted LSPs is adjusted in a next step, where the total number serves as a link cost of the link;

a second cost calculating unit 8220, configured to calculate costs of LSPs according to the link cost; and a second temporary LSP selecting unit 8230, configured to select an LSP with a lowest cost to serve as the temporary LSP of the selected to-be-adjusted LSP.

Figure 9:
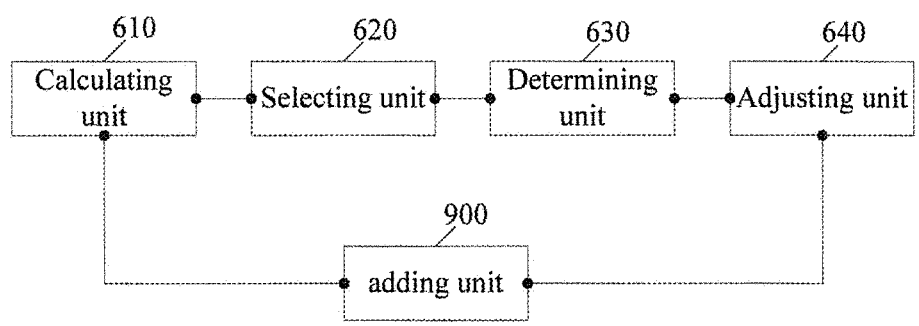
FIG. 9 is a schematic structural diagram of a rerouting sequence planning system according to another embodiment of the present application.

As shown in FIG. 9, the rerouting sequence planning system 600 may further include:

an iterating unit 900, configured to: after the to-be-adjusted LSP is adjusted to a corresponding final-state LSP or temporary LSP, when a to-be-postprocessed list still stores a temporary LSP and an unsuccessfully adjusted to-be-adjusted LSP, use the temporary LSP and the unsuccessfully adjusted to-be-adjusted LSP in the to-be-postprocessed list as new to-be-adjusted LSPs.

Specifically, adjustment is stopped when the number of iterations of adjusting the to-be-adjusted LSP reaches a preset maximum value; and, when the number of iterations of adjusting the to-be-adjusted LSP does not reach the preset maximum value, a step of calculating reference values of the to-be-adjusted label switched paths LSPs is performed.

Figure 10:
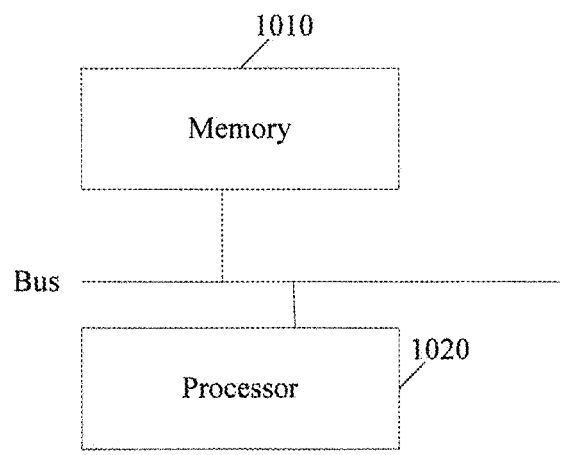
FIG. 10 is a schematic structural diagram of a rerouting device according to an embodiment of the present application.

Referring to FIG. 10, an embodiment of the present application further provides a rerouting sequence planning device, which may include a memory 1010 and at least one processor 1020 (one processor is used as an example in FIG. 10). In some embodiments of the present application, the memory 1010 may be connected to the processor 1020 by using a bus or in other manners. FIG. 10 gives an example in which the connection is implemented by using a bus.

The processor 1020 performs the following steps: calculating reference values of to-be-adjusted label switched paths LSPs, where the reference values are used to denote adjusted priorities of the to-be-adjusted LSPs; selecting a to-be-adjusted LSP with a highest priority from the to-be-adjusted LSPs; determining, according to a critical value of the reference values of the to-be-adjusted LSPs and a reference value of the to-be-adjusted LSP with the highest priority, whether the to-be-adjusted LSP with the highest priority is suitable for adjustment, where the critical value of the reference values of the to-be-adjusted LSPs denotes a minimum reference value required for a to-be-adjusted LSP to be adjusted to a final-state LSP; if the to-be-adjusted LSP with the highest priority is suitable for adjustment, adjusting the to-be-adjusted LSP with the highest priority to a corresponding final-state LSP; and if the to-be-adjusted LSP with the highest priority is not suitable for adjustment, selecting at least one to-be-adjusted LSP and adjusting the at least one selected to-be-adjusted LSP to a corresponding temporary LSP.

In some embodiments of the present application, the processor 1020 may further perform the following steps: calculating remaining capacities of links that are in a final-state LSP and do not coincide with those in a to-be-adjusted LSP; obtaining link reference values according to the remaining capacities and a bandwidth of the to-be-adjusted LSP; and selecting a smallest link reference value to serve as a reference value of the to-be-adjusted LSP.

In some embodiments of the present application, the processor 1020 may further perform the following steps: calculating reserved capacities and total capacities of links that are in a final-state LSP and do not coincide with those in a to-be-adjusted LSP; obtaining link reference values according to a bandwidth of the to-be-adjusted LSP, the reserved capacities and the total capacities; and calculating a negative value of a largest link reference value to serve as a reference value of the to-be-adjusted LSP.

In some embodiments of the present application, the processor 1020 may further perform the following step: selecting a to-be-adjusted LSP with a largest reference value from the to-be-adjusted LSPs; or selecting a to-be-adjusted LSP with a smallest reference value from the to-be-adjusted LSPs.

In some embodiments of the present application, the processor 1020 may further perform the following steps: selecting at least one to-be-adjusted LSP from the to-be-adjusted LSPs; calculating a temporary LSP for the selected to-be-adjusted LSP; and adjusting the selected to-be-adjusted LSP to the temporary LSP.

In some embodiments of the present application, the processor 1020 may further perform the following steps: calculating remaining capacities of links in a network; calculating link costs of the links according to the remaining capacities; calculating the cost of the LSP according to the link costs; and selecting an LSP with a lowest cost to serve as the temporary LSP of the selected to-be-adjusted LSP.

In some embodiments of the present application, the processor 1020 may further perform the following steps: calculating a total number of bandwidth constraints violated of a link in the network when each of the to-be-adjusted LSPs is adjusted in a next step, where the total number serves as a link cost of the link; calculating costs of LSPs according to the link cost; and selecting an LSP with a lowest cost to serve as the temporary LSP of the selected to-be-adjusted LSP.

In some embodiments of the present application, the processor 1020 may further perform the following steps: after the to-be-adjusted LSP is adjusted to a corresponding final-state LSP or temporary LSP, when a to-be-postprocessed list still stores a temporary LSP and an unsuccessfully adjusted to-be-adjusted LSP, using the temporary LSP and the unsuccessfully adjusted to-be-adjusted LSP in the to-be-postprocessed list as new to-be-adjusted LSPs, and performing a step of calculating reference values of the to-be-adjusted label switched paths LSPs.

In some embodiments of the present application, the processor 1020 may further perform the following steps: stopping adjustment when the number of iterations of adjusting the to-be-adjusted LSP reaches a preset maximum value; and when the number of iterations of adjusting the to-be-adjusted LSP does not reach the preset maximum value, performing the step of calculating the reference values of the to-be-adjusted label switched paths LSPs.

In some embodiments of the present application, the memory 1010 may be used to store the to-be-adjusted LSPs and the temporary LSP.

In some embodiments of the present application, the memory 1010 may be further used to store the reference values of the to-be-adjusted LSPs and the critical value of the reference values of the to-be-adjusted LSPs.

A person of ordinary skill in the art may understand that all or a part of the steps of the methods in the embodiments may be implemented by a program instructing relevant hardware. The program may be stored in a computer readable storage medium. The storage medium may include: a read-only memory, a magnetic disk, an optical disc or the like.

The foregoing has described in detail a rerouting sequence planning method and system provided in the present application. With respect to specific implementation manners and application scopes of the present application, modifications and variations may be made by a person of ordinary skill in the art according to the idea of the embodiments of the present application. Therefore, the content of the specification shall not be construed as a limitation to the present application.

What is claimed is:
1. A method, comprising:
calculating reference values of to-be-adjusted label switched paths (LSPs) for denoting adjusted priorities of the to-be-adjusted LSPs;
selecting a to-be-adjusted LSP with a highest priority from the to-be-adjusted LSPs;
determining, according to a critical value of the reference values of the to-be-adjusted LSPs and a reference value of the to-be-adjusted LSP with the highest priority, whether the to-be-adjusted LSP with the highest priority is suitable for adjustment, wherein the critical value of the reference values of the to-be-adjusted LSPs denotes a minimum reference value required for a to-be-adjusted LSP to be adjusted to a first LSP;

when the to-be-adjusted LSP with the highest priority is suitable for adjustment, adjusting the to-be-adjusted LSP with the highest priority to a corresponding first LSP; and when the to-be-adjusted LSP with the highest priority is not suitable for adjustment, selecting at least one to-be-adjusted LSP and adjusting the at least one selected to-be-adjusted LSP to a corresponding temporary LSP; and after the to-be-adjusted LSP is adjusted to a corresponding first LSP or temporary LSP, when a first list still stores a temporary LSP and an unsuccessfully adjusted to-be-adjusted LSP, using the temporary LSP and the unsuccessfully adjusted to-be-adjusted LSP in the first list as new to-be-adjusted LSPs;

wherein after using the temporary LSP and the unsuccessfully adjusted to-be-adjusted LSP in the first list as new to-be-adjusted LSPs, the method comprises:

stopping adjustment when a number of iterations of adjusting the to-be-adjusted LSPs reaches a preset maximum value; and when the number of iterations of adjusting the to-be-adjusted LSPs does not reach the preset maximum value, performing the step of calculating the reference values of the to-be-adjusted LSPs.

2. The method according to claim 1, wherein calculating reference values of to-be-adjusted label switched paths (LSPs) comprises:

calculating remaining capacities of links that are in a first LSP and do not coincide with those in a to-be-adjusted LSP;

obtaining link reference values according to the remaining capacities and a bandwidth of the to-be-adjusted LSP; and selecting a smallest link reference value to serve as a reference value of the to-be-adjusted LSP.

3. The method according to claim 1, wherein calculating reference values of to-be-adjusted label switched paths (LSPs) comprises:

calculating reserved capacities and total capacities of links that are in a first LSP and do not coincide with those in a to-be-adjusted LSP;

obtaining link reference values according to a bandwidth of the to-be-adjusted LSP, the reserved capacities and the total capacities; and calculating a negative value of a largest link reference value to serve as a reference value of the to-be-adjusted LSP.

4. The method according to claim 1, wherein selecting a to-be-adjusted LSP with a highest priority from the to-be-adjusted LSPs comprises one of:

selecting a to-be-adjusted LSP with a largest reference value from the to-be-adjusted LSPs; and selecting a to-be-adjusted LSP with a smallest reference value from the to-be-adjusted LSPs.

5. The method according to claim 1, wherein selecting at least one to-be-adjusted LSP and adjusting the at least one selected to-be-adjusted LSP to a corresponding temporary LSP comprises:

selecting at least one to-be-adjusted LSP from the to-be-adjusted LSPs;

calculating a temporary LSP for the selected to-be-adjusted LSP; and adjusting the selected to-be-adjusted LSP to the temporary LSP.

6. The method according to claim 5, wherein calculating a temporary LSP for the selected to-be-adjusted LSP comprises:

calculating remaining capacities of links in a network;

calculating link costs of the links according to the remaining capacities;

calculating costs of LSPs according to the link costs; and selecting an LSP with a lowest cost to serve as the temporary LSP of the selected to-be-adjusted LSP.

7. The method according to claim 5, wherein calculating a temporary LSP for the selected to-be-adjusted LSP comprises:

calculating a total number of bandwidth constraints violated of a link in a network when each of the to-be-adjusted LSPs is adjusted in a next step, wherein the total number serves as a link cost of the link;

calculating costs of LSPs according to the link cost; and selecting an LSP with a lowest cost to serve as the temporary LSP of the selected to-be-adjusted LSP.

8. A device, comprising:

a memory storing computer executable program codes; and a processor coupled to the memory, wherein the program codes comprise instructions which, when executed by the processor, cause the device to:

calculate reference values of to-be-adjusted label switched paths (LSPs) for denoting adjusted priorities of the to-be-adjusted LSPs, select a to-be-adjusted LSP with a highest priority from the to-be-adjusted LSPs, determine, according to a critical value of the reference values of the to-be-adjusted LSPs and a reference value of the to-be-adjusted LSP with the highest priority, whether the to-be-adjusted LSP with the highest priority is suitable for adjustment, wherein the critical value of the reference values of the to-be-adjusted LSPs denotes a minimum reference value required for a to-be-adjusted LSP to be adjusted to a first LSP, when the to-be-adjusted LSP with the highest priority is suitable for adjustment, adjust the to-be-adjusted LSP with the highest priority to a corresponding first LSP; and when the to-be-adjusted LSP with the highest priority is not suitable for adjustment, select at least one to-be-adjusted LSP and adjust the at least one selected to-be-adjusted LSP to a corresponding temporary LSP, after the to-be-adjusted LSP is adjusted to a corresponding first LSP or temporary LSP, when a first list still stores a temporary LSP and an unsuccessfully adjusted to-be-adjusted LSP, use the temporary LSP and the unsuccessfully adjusted to-be-adjusted LSP in the first list as new to-be-adjusted LSPs, wherein after using the temporary LSP and the unsuccessfully adjusted to-be-adjusted LSP in the first list as new to-be-adjusted LSPs, the program codes further comprise instructions which, when executed by the processor, cause the device to:

stop adjustment when a number of iterations of adjusting the to-be-adjusted LSPs reaches a preset maximum value, and when the number of iterations of adjusting the to-be-adjusted LSPs does not reach the preset maximum value, perform the step of calculating the reference values of the to-be-adjusted LSPs.

9. The device according to claim 8, wherein the program codes further comprise instructions which, when executed by the processor, cause the device to:
- calculate remaining capacities of links that are in a first LSP and do not coincide with those in a to-be-adjusted LSP;
- obtain link reference values according to the remaining capacities and a bandwidth of the to-be-adjusted LSP; and
- select a smallest link reference value to serve as a reference value of the to-be-adjusted LSP.

10. The device according to claim 8, wherein the program codes further comprise instructions which, when executed by the processor, cause the device to:
- calculate reserved capacities and total capacities of links that are in a final state first LSP and do not coincide with those in a to-be-adjusted LSP;
- obtain link reference values according to a bandwidth of the to-be-adjusted LSP, the reserved capacities and the total capacities; and
- calculate a negative value of a largest link reference value to serve as a reference value of the to-be-adjusted LSP.

11. The device according to claim 8, wherein the program codes further comprise instructions which, when executed by the processor, cause the device to:
- when the to-be-adjusted LSP with the highest priority is suitable for adjustment, adjust the to-be-adjusted LSP with the highest priority to a corresponding first LSP;
- select at least one to-be-adjusted LSP from the to-be-adjusted LSPs;
- calculate a temporary LSP for the selected to-be-adjusted LSP; and
- adjust the selected to-be-adjusted LSP to the temporary LSP.

12. The device according to claim 11, wherein the program codes further comprise instructions which, when executed by the processor, cause the device to:
- calculate remaining capacities of links in a network;
- calculate link costs of the links according to the remaining capacities;
- calculate costs of LSPs according to the link costs; and
- select an LSP with a lowest cost to serve as the temporary LSP of the selected to-be-adjusted LSP.

13. The device according to claim 11, wherein the program codes further comprise instructions which, when executed by the processor, cause the device to:
- calculate a total number of bandwidth constraints violated of a link in the network when each of the to-be-adjusted LSPs is adjusted in a next step, wherein the total number serves as a link cost of the link;
- calculate costs of LSPs according to the link cost; and
- select an LSP with a lowest cost to serve as the temporary LSP of the selected to-be-adjusted LSP.

* * * * *